US008862187B2

(12) United States Patent
Kim (10) Patent No.: US 8,862,187 B2
(45) Date of Patent: Oct. 14, 2014

(54) METHOD AND APPARATUS FOR SETTING AND EXECUTING FUNCTION PROFILES IN MOBILE COMMUNICATION TERMINAL

(75) Inventor: Kyu Hyun Kim, Daegu Metropolitan (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 1120 days.

(21) Appl. No.: 11/799,784

(22) Filed: May 3, 2007

(65) Prior Publication Data
US 2008/0113681 A1    May 15, 2008

(30) Foreign Application Priority Data

Nov. 9, 2006   (KR) ................. 10-2006-0110440

(51) Int. Cl.
| H04M 1/00 | (2006.01) |
| H04M 1/73 | (2006.01) |
| H04W 8/18 | (2009.01) |
| H04M 1/725 | (2006.01) |
| H04W 52/02 | (2009.01) |

(52) U.S. Cl.
CPC ............ *H04M 1/73* (2013.01); *H04M 1/72563* (2013.01); *H04W 52/0274* (2013.01); *H04W 52/0264* (2013.01); *Y02B 60/50* (2013.01); *H04W 52/0261* (2013.01); *H04W 52/027* (2013.01); *H04W 8/183* (2013.01)
USPC ........................................................ 455/574

(58) Field of Classification Search
CPC ............ H04W 52/00; H04W 52/0264; H04W 52/0209; H04W 52/0267; H04W 52/0274; H04W 52/027; H04W 52/0287
USPC ........................................................ 455/574
See application file for complete search history.

(56) References Cited

U.S. PATENT DOCUMENTS

| 7,231,198 | B2* | 6/2007 | Loughran ................ 455/343.2 |
| 7,242,971 | B2* | 7/2007 | Park ........................ 455/574 |
| 2002/0132653 | A1* | 9/2002 | Okamoto et al. ........ 455/574 |
| 2003/0008686 | A1* | 1/2003 | Park et al. ............... 455/566 |
| 2005/0070339 | A1* | 3/2005 | Kim ......................... 455/572 |
| 2005/0268240 | A1* | 12/2005 | Kankaanpaa .......... 715/747 |
| 2006/0046694 | A1* | 3/2006 | Yu ............................ 455/411 |
| 2007/0218886 | A1* | 9/2007 | Fujimoto et al. ........ 455/418 |
| 2008/0102899 | A1* | 5/2008 | Zhang et al. ............ 455/566 |

FOREIGN PATENT DOCUMENTS

| KR | 2003-93878 | 12/2003 | ............ H04B 1/40 |
| KR | 2004-69512 | 8/2004 | ............ H04B 1/40 |
| KR | 2005-70542 | 7/2005 | ............ H04B 1/40 |
| KR | 2006-57465 | 5/2006 | ............ H04B 1/40 |

OTHER PUBLICATIONS

TransTalk 9000—MDW 9040 Wireless Pocket Phone Installation and Use, AVAYA Communication, Feb. 2001.*

* cited by examiner

*Primary Examiner* — Marisol Figueroa
(74) *Attorney, Agent, or Firm* — Cha & Reiter, LLC (57) ABSTRACT

A method and apparatus for setting and executing a function profile in a mobile communication terminal to manage its battery usage. The method includes determining whether a function profile setting function is set; selecting, if a function profile setting function is set, a specific function and executing the function according to a set function profile. Therefore, each function of the mobile communication terminal can be executed in an optimal function profile which in turn reduces unnecessary power consumption of the mobile communication terminal.

20 Claims, 6 Drawing Sheets

METHOD AND APPARATUS FOR SETTING AND EXECUTING FUNCTION PROFILES IN MOBILE COMMUNICATION TERMINAL

CLAIMS OF PRIORITY

This application claims priority to an application entitled "METHOD AND APPARATUS FOR SETTING AND EXECUTING FUNCTION PROFILES IN MOBILE COMMUNICATION TERMINAL," filed in the Korean Intellectual Property Office on Nov. 9, 2006 and assigned Serial No. 2006-0110440, the contents of which are incorporated herein by reference.

BACKGROUND OF THE INVENTION

1. Field of the Invention

The present invention relates to a method and apparatus for extending the battery life of a mobile communication terminal.

2. Description of the Related Art

In a mobile communication terminal, it is desirable to extend the battery life. The mobile communication terminal typically uses a pre-charged battery as a power source, and according to the charge capacity of a battery, a maximum usage time thereof is determined.

Nowadays, the mobile communication terminal has various functions in addition to the conventional communication function. For example, the mobile communication terminal is now equipped for providing time information such as a time or date, electronic scheduler function, alarm function, game function, photographing function, or music file playing function. The additional functions are sometimes used as frequently as the conventional communication function.

In general, the mobile communication terminal operates the communication function and other additional functions in a power-up state, i.e. a state in which power is supplied to the entire device of the mobile communication terminal.

Accordingly, even when only a specific function of a mobile communication terminal is desired, the power is supplied to the entire device, thus unnecessarily shortening the battery life.

SUMMARY OF THE INVENTION

The present invention has been made in an effort to solve the above problems and provides additional advantages, by providing a method and apparatus for setting and executing a function profile in a mobile communication terminal that can reduce the power consumption via selectively blocking power supply to unused or unnecessary components of the mobile communication terminal.

Another aspect of the present invention is to provide a method and apparatus for setting and executing a function profile in a mobile communication terminal that can execute a specific function in an optimal function profile.

In accordance with an aspect of the present invention, a method of setting and executing a function profile in a mobile communication terminal includes: determining whether a function profile setting function is set; selecting, if a function profile setting function is set, a specific function and executing the function according to a set function profile.

In accordance with another aspect of the present invention, a method of setting and executing a function profile in a mobile communication terminal includes: determining whether a function profile setting function exists; executing, if a function profile setting function exists, a function according to the function profile setting function; and executing, if another function is selected while executing the function according to the set function profile, the newly selected function according to the set function profile.

In accordance with another aspect of the present invention, a method of setting and executing a function profile in a mobile communication terminal includes: determining whether a function profile setting function exists; selecting, if a function profile setting function exists, a specific function; setting a function profile of the selected function; and selecting, if a function profile setting function is set, a specific function and executing the function according to a set function profile.

In accordance with another aspect of the present invention, a mobile communication terminal having a function profile setting function includes: a function profile setting unit for setting a function profile; and a controller for controlling to set the function profile necessary for driving each unit of the mobile communication terminal by the function profile setting unit.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In exemplary embodiments of the present invention, a "backlight" represents a background light of a display unit or key pad of a mobile communication terminal and is configured to assist a user to see the displayed content or the key pad in a dark place. A "Hard Disk Drive (HDD)" is an auxiliary memory device for storing data and provided within the mobile communication terminal.

Figure 1:
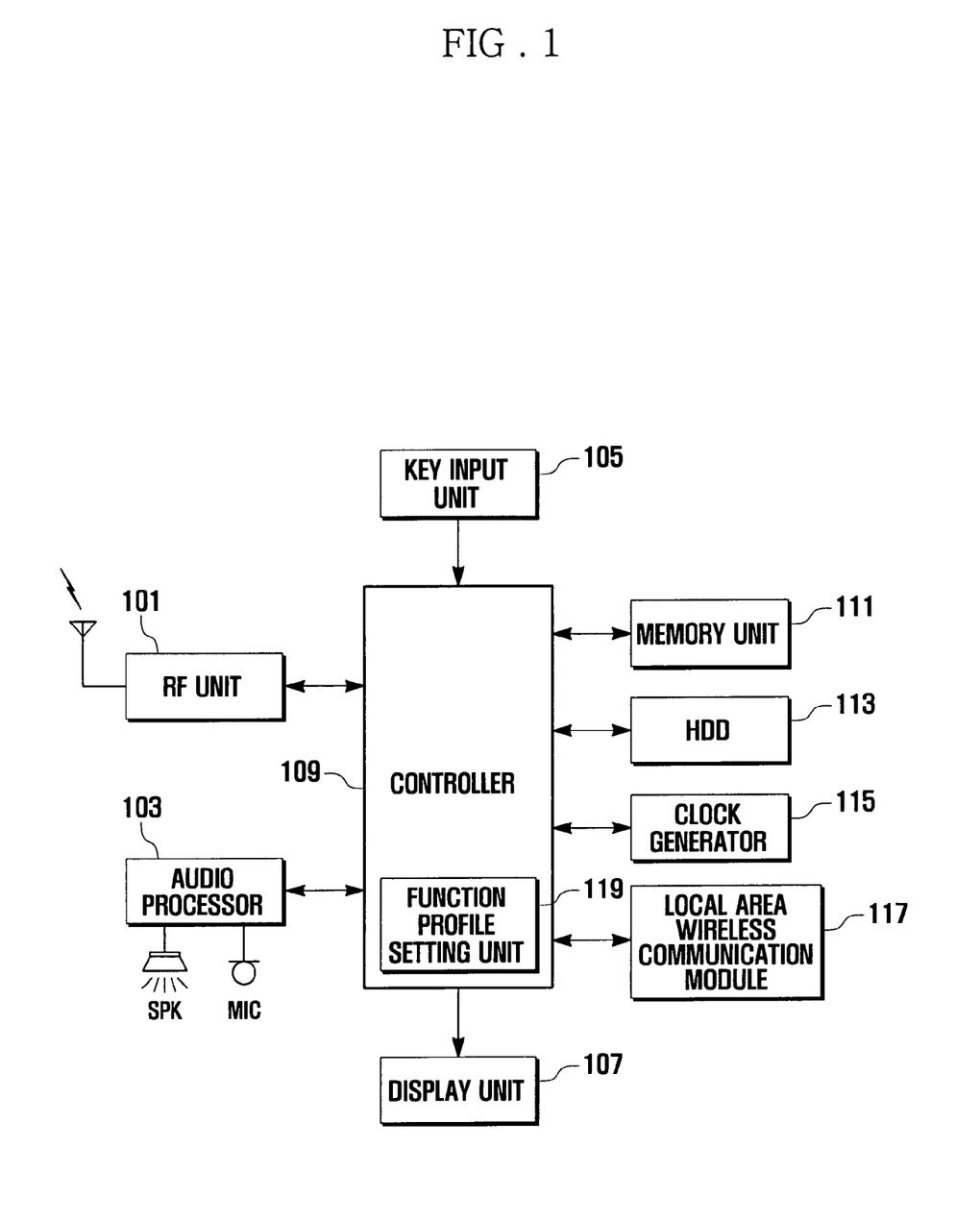
FIG. 1 is a block diagram illustrating a configuration of a mobile communication terminal for setting and executing a function profile according to an exemplary embodiment of the present invention.

FIG. 1 is a block diagram illustrating a configuration of a mobile communication terminal for setting and executing a function profile according to an exemplary embodiment of the present invention.

Referring to FIG. 1, the mobile communication terminal includes a radio frequency (RF) unit 101, audio processor 103, key input unit 105, display unit 107, controller 109, memory unit 111, HDD 113, clock generator 115, local area wireless communication module 117, and function profile setting unit 119.

The RF unit 101 performs a wireless communication function of the mobile communication terminal and includes an RF transmitter for up-converting a frequency of a signal to be transmitted and amplifying the signal, and an RF receiver for low-noise amplifying a received signal and down-converting a frequency thereof.

The audio processor 103 reproduces an audio signal output from an audio codec of the controller 109 through a speaker SPK and transmits an audio signal generated from a microphone MIC to the audio codec of the controller 109.

The key input unit 105 receives a user's manipulation signal for controlling the operation of the mobile communication terminal. Further, the key input unit 105 receives a user's manipulation signal for setting a function profile and for performing communication and additional functions. Under the key pad of the key input unit 105, a backlight including a plurality of Light Emitting Diodes (LED) is provided.

The display unit 107 displays output data under the control of the controller 109. The display unit 107 may use an LCD, and in this case, the display unit 107 includes an LCD controller, memory for storing image data, and LCD display element. When the display unit 107 is a touch screen, the display unit 107 is used as an input unit. Under the liquid crystal screen of the display unit 107, a backlight including a plurality of LEDs is provided.

The controller 109 controls the entire operation of the mobile communication terminal. The controller 109 also controls the profile setting function according to the teachings of the present invention. The controller 109 adjusts the backlights of the key input unit 105 and the display unit 107 by detecting an adjusted brightness value of the backlight stored in the memory unit 111. Further, the controller 109 controls the operation of the HDD 113 and the local area wireless communication module 117 and controls a clock frequency of the clock generator 115.

The function profile setting unit 119 stores function profiles optimally set for each function and enables, if a function profile function is set through the manipulation of the key input unit 105, each function to be automatically executed in the set function profile.

The memory unit 111 includes a program memory and a data memory. The program memory stores programs for controlling the general operation of the mobile communication terminal and programs for performing a function profile setting function according to the present exemplary embodiment. The data memory temporarily stores data generated while performing the programs. Further, the memory unit 111 stores a backlight brightness value corresponding to each graduation of the backlight.

The HDD 113 is an auxiliary memory device for storing and reading data while rotating a circular aluminum substrate covered with a magnetic material. The HDD 113 has a form in which disks are stacked, and concentric circles called tracks are formed on the disk. Data are electromagnetically recorded within each disk. A head records data on, and reads data from, the tracks.

The clock generator 115 provides a clock necessary for driving the controller 109 that stably provides a high speed of clock signal and receives a control signal for determining the driving from the controller 109. The clock generator 15 generally uses an oscillator, not the crystal or resonator frequently found in mobile communication terminals. The clock generator 115 can vary a clock frequency for each function by the setting of the function profile setting unit 119 according to the present exemplary embodiment.

The local area wireless communication module 117 performs a series of operations for transmitting and receiving a control signal and an audio signal through a wireless interface. The local area wireless communication module 117 can use a communication type such as Bluetooth, Infrared, or Zigbee and can use various wireless communication modules for transmitting and receiving a signal by forming a communication channel in a local area.

Figure 2:
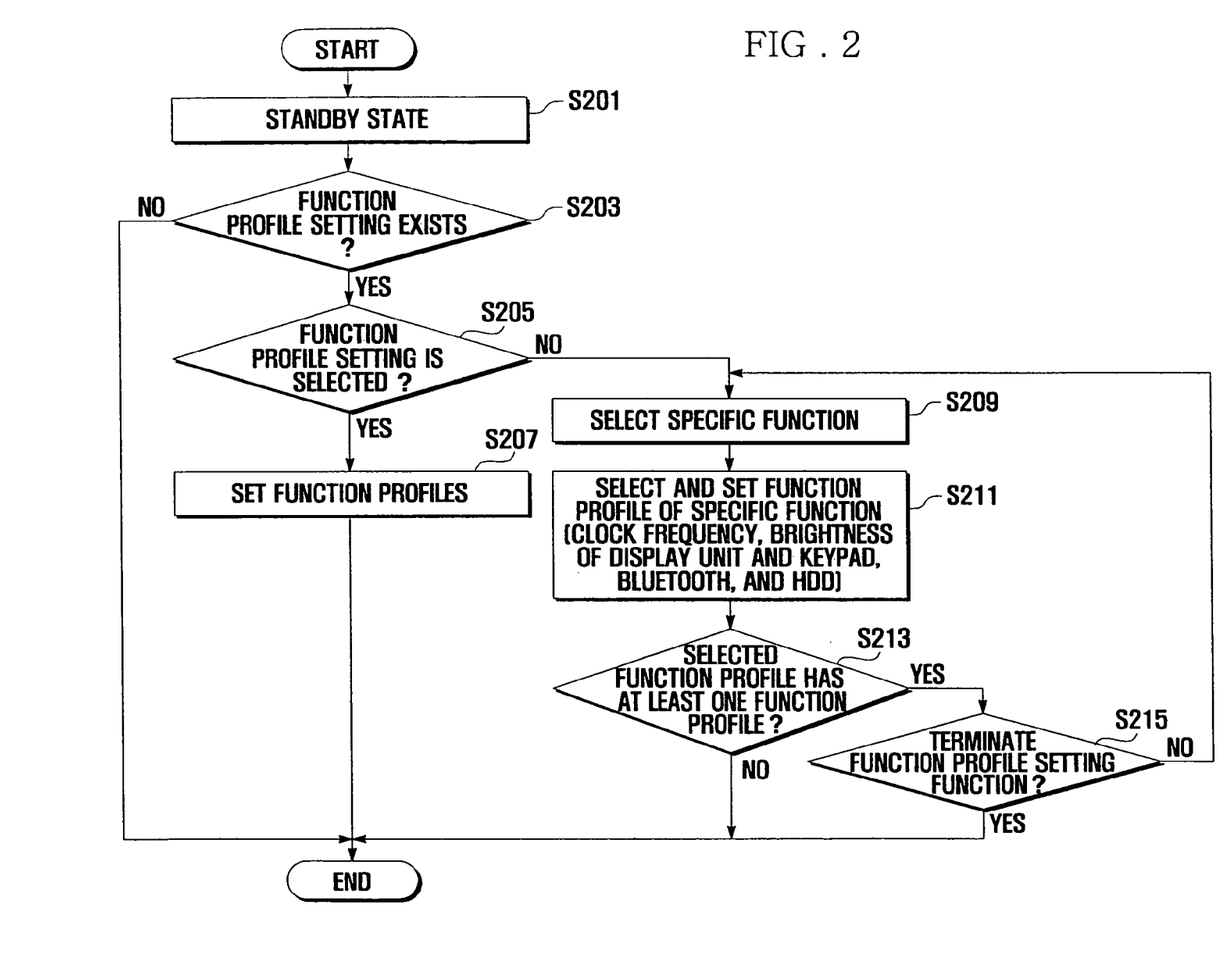
FIG. 2 is a flowchart illustrating a setting operation of a function profile in a mobile communication terminal according to an exemplary embodiment of the present invention.
Figure 3:
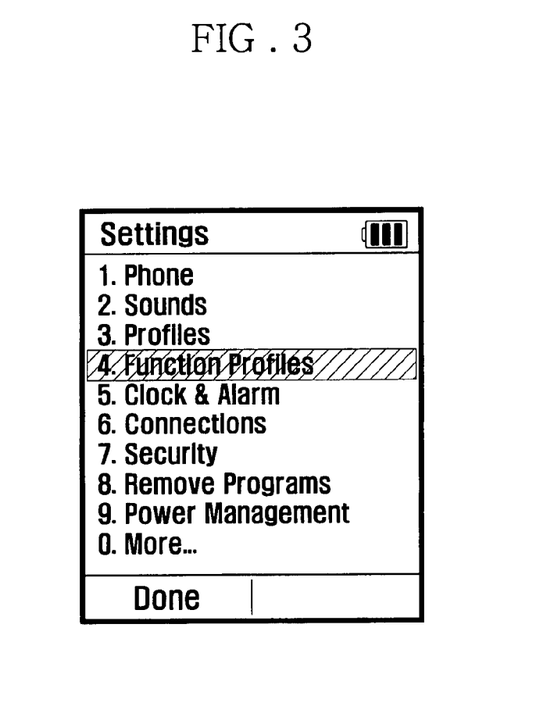
FIG. 3 is a diagram illustrating an example of a screen showing the selection of a function profile in a mobile communication terminal in the setting operation of FIG. 2.
Figure 4:
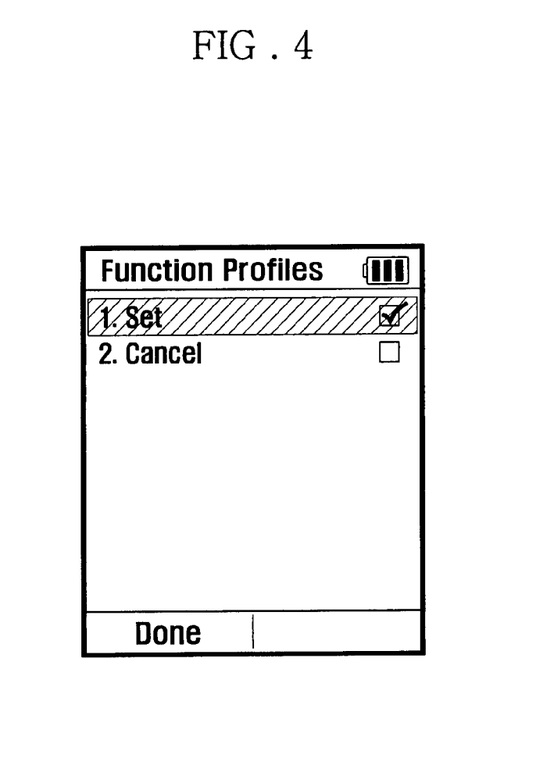
FIG. 4 is a diagram illustrating an example of a screen showing the setting of a function profile in a mobile communication terminal in the setting operation of FIG. 2.
Figure 5A:
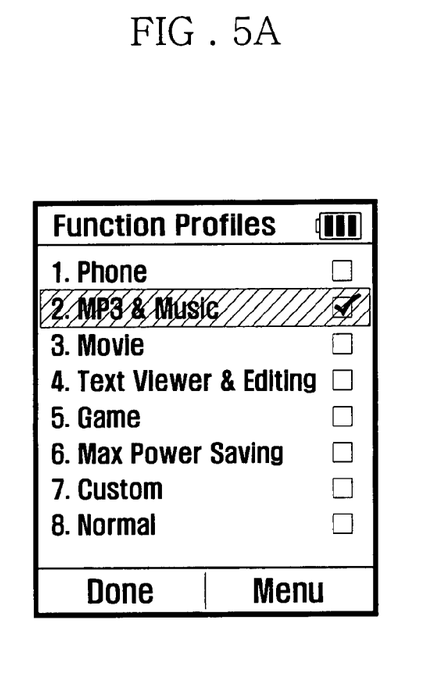
FIGS. 5a to 5c are diagrams illustrating examples of screens showing steps of setting a function profile in a mobile communication terminal in the setting operation of FIG. 2.
Figure 5B:
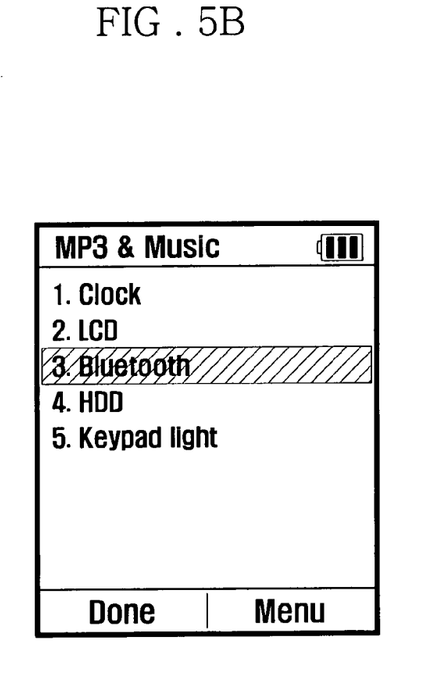
Figure 5C:
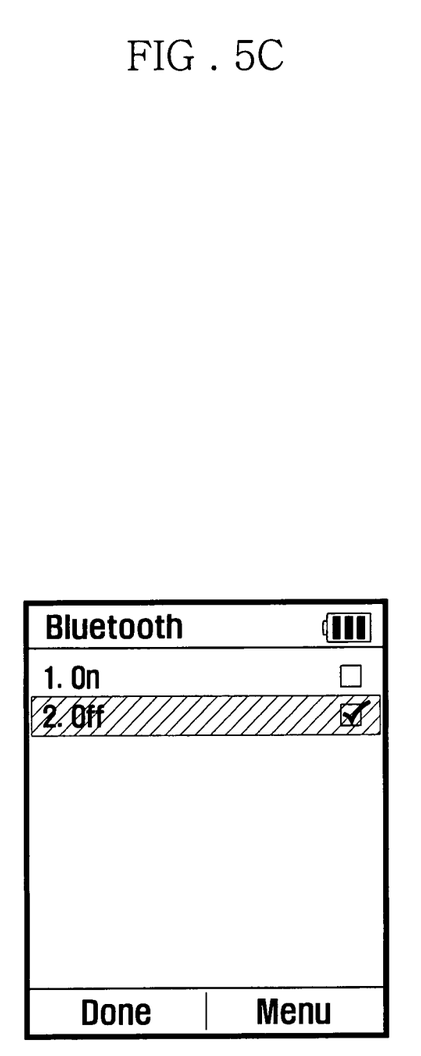

FIG. 2 is a flowchart illustrating the setting operation of a function profile in a mobile communication terminal according to an exemplary embodiment of the present invention. FIG. 3 is a diagram illustrating an example of a screen showing the selection of a function profile in a mobile communication terminal in the setting operation of FIG. 2. FIG. 4 is a diagram illustrating an example of a screen showing the setting of a function profile in a mobile communication terminal in the setting operation of FIG. 2. FIGS. 5a to 5c are diagrams illustrating examples of screens showing steps of setting a function profile in a mobile communication terminal in the setting operation of FIG. 2.

Referring to FIGS. 1 to 5c, the operation of setting a function profile in the mobile communication terminal of FIG. 1 is described hereinafter.

As shown in FIG. 2, the controller 109 recognizes a standby state of the mobile communication terminal (S201).

Next, the controller 109 determines whether a function profile setting function exists in the mobile communication terminal (S203). If the function profile setting does not exist in the mobile communication terminal, the process ends because the present exemplary embodiment cannot be executed.

If the function profile setting exists in the mobile communication terminal, the controller 109 determines whether the function profile setting is selected (S205). The function profile setting can be selected by a user through the key input unit 105, and a screen for selecting the function profile setting is shown in FIG. 3. As shown in FIG. 3, a function profile setting option is selected from a 'settings' menu on the screen of the mobile communication terminal through the key input unit 105.

If a function profile setting is selected, the controller 109 automatically sets the function profiles (S207). If the user selects the function profile setting at step S205, a screen for selecting 'set' from the function profile menu is shown in FIG. 4. The user sets the function profiles through the key input unit 105. Accordingly, optimal function profiles for each function are automatically set.

The optimal function profiles for each function are shown in Table 1. The function profiles shown in Table 1 are for illustrative purposes, thus it should be noted that function profiles are not limited thereto.

TABLE 1

| | Function profile | | | | |
|---|---|---|---|---|---|
| Function | Clock frequency | Brightness of display unit | Bluetooth | HDD | Brightness of key pad |
| Phone | 208 MHz | 1 | OFF | OFF | OFF |
| MP3 | 416/208 MHz | 2 | OFF | ON | OFF |

TABLE 1-continued

| | | Function profile | | | |
|---|---|---|---|---|---|
| Function | Clock frequency | Brightness of display unit | Blutoo-th | HDD | Brightn-ess of key pad |
| Movie | 416 MHz | 5 | OFF | ON | OFF |
| Text | 208 MHz | 4 | OFF | ON | OFF |
| Game | 416 MHz | 4 | OFF | ON | ON |
| Maximum power Saving | 208 MHz | 1 | OFF | OFF | OFF |
| Custom | Random change by user | | | | |

If the function profile setting is not selected at step S205, a user inputs a specific function and the controller 109 recognizes the specific function (S209). When the user does not select the function profile setting from the screen shown in FIG. 3 through the key input unit 105, the entire functions of the mobile communication terminal are displayed in the display unit 107 as shown in FIG. 5a. The user can select a specific function, e.g. an MP3 & Music function, for setting a function profile from the several displayed functions.

After selecting a specific function, the user selects a specific function profile of the function and inputs a setting value, and the controller 109 recognizes the function profile (S211). When the user selects the specific function from the screen shown in FIG. 5a through the key input unit 105, function profiles (e.g. a clock frequency, brightness of a display unit, operation state of Bluetooth, operation state of HDD, and brightness of keypad) of hardware provided within the mobile communication terminal are displayed in the display unit 107, as shown in FIG. 5b. The user can select a specific function profile for setting, e.g. Bluetooth, from the function profiles displayed in the display unit 107.

As shown in FIG. 5c, the user inputs a setting value for the selected function profile, e.g. whether to operate Bluetooth, through the key input unit 105. As shown in FIGS. 5a to 5c, because the user selects the MP3 & Music function, it is unnecessary to operate Bluetooth and thus the user turns off the Bluetooth feature. In the present exemplary embodiment, the setting operation of the function profile is illustrated to set one function in a single function profile, however it should be noted that the setting operation according to the teachings of the present invention is not limited thereto.

Next, the controller 109 determines whether the selected function profile has at least one function profile (S213). If the selected function profile does not have at least one function file, the controller 109 terminates the process of setting a function profile.

If the selected function has at least one function profile, the controller 109 determines whether to terminate the function profile setting function (S215). Even though the selected function has at least one function profile, the user may, nevertheless, want to terminate the function profile setting function. Hence, even though function profiles are not set for each function, if a termination signal of the function profile setting function is received, the controller 109 terminates the process. If a termination signal of the function profile setting function is not received, the process returns to step S209, and the controller 109 continues to perform the process of setting the function profile.

Figure 6:
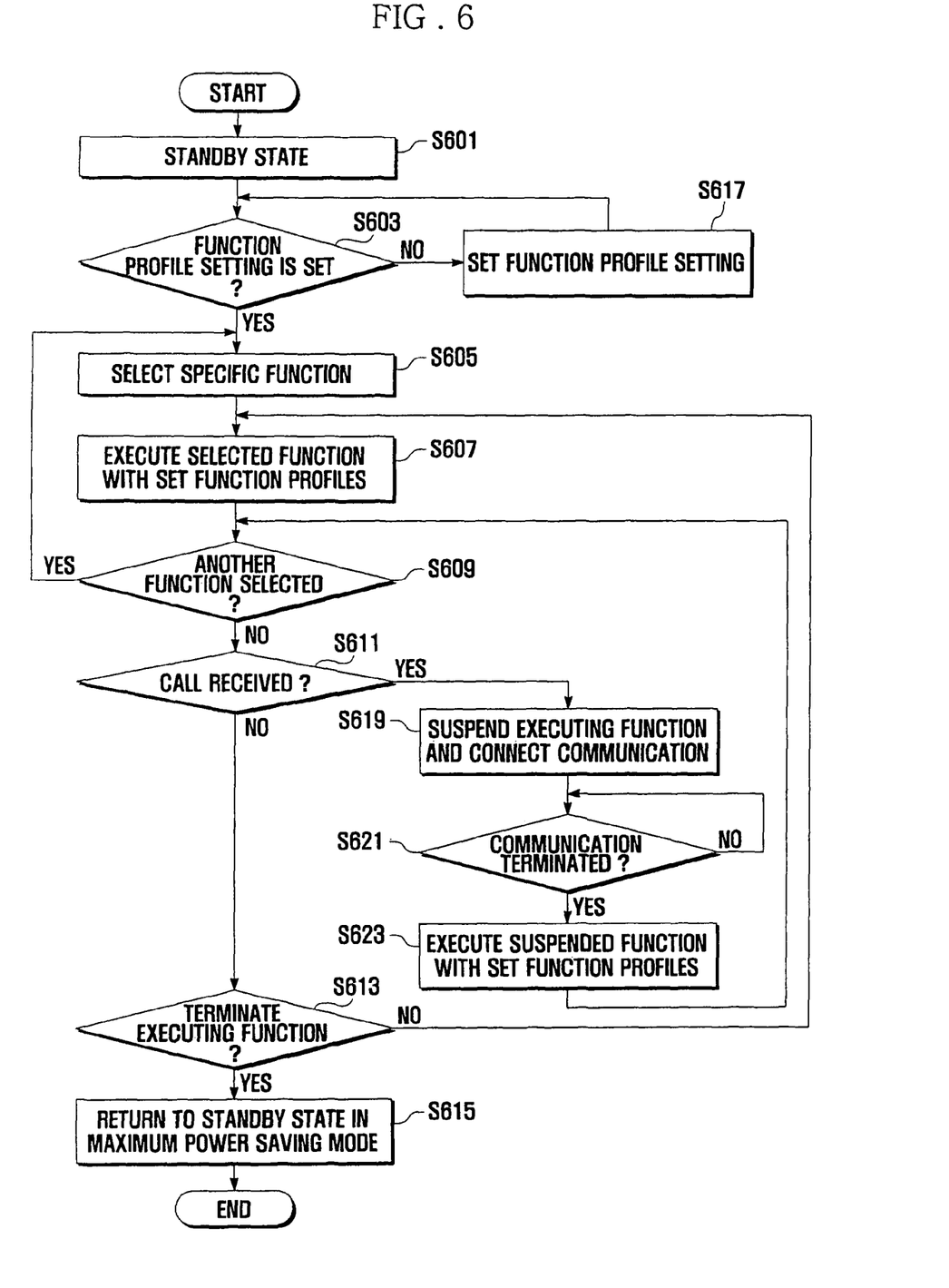
FIG. 6 is a flowchart illustrating an executing operation of a function profile in a mobile communication terminal according to an exemplary embodiment of the present invention.

FIG. 6 is a flowchart illustrating the operation steps of a function profile in the mobile communication terminal of FIG. 1 according to an exemplary embodiment of the present invention.

Referring to FIG. 6, the controller 109 recognizes a standby state of the mobile communication terminal (S601).

Next, the controller 109 determines whether a function profile setting function is set (S603).

If a function profile setting function is not set, the controller 109 sets the function profile setting (S617). The function profile setting may be set with a method described with reference to FIGS. 2 to 5c.

If the function profile setting is set, the controller 109 recognizes a user input selection of a specific function (S605). The specific function is selected through the key input unit 105.

Next, the controller 109 executes the selected function with the corresponding set function profiles (S607). As in the described method of setting a function profile, for example, an MP3 & Music function is executed with the function profiles shown in Table 1.

The controller 109 determines whether another function is selected while executing the selected function (S609). If another function is selected while executing the selected function, the process returns to step S605 and the controller 109 executes the newly selected function with the corresponding set function profiles.

If another function is not selected while executing the selected function, the controller 109 determines whether a call is received (S611). The controller 109 determines whether a call is received, for example, while listening to music executed with the MP3 & Music function.

If a call is not received, the controller 109 determines whether a termination signal of the executing function is received (S613). If a termination signal of the executing function is not received, the process returns to step S607 and the controller 109 continues to execute the selected function.

If a termination signal of the executing function is received, the mobile communication terminal returns to a standby state (S615). Here, the standby state of the mobile communication terminal is a standby state set in a function profile, e.g. a maximum power saving mode set in the described function profile setting process.

If a call is received at step S611, the controller 109 suspends the executing function and connects to establish a communication (S619). When the call is received, the controller 109 suspends an execution of the MP3 & Music function and makes a call connection.

Next, the controller 109 determines whether the communication is terminated (S621), and if the communication is terminated, continues to execute the suspended function with the set function profiles (S623). When the communication is terminated, the controller 109 executes again the MP3 & Music function.

The process then returns to step S609, and the controller 109 determines whether another function is selected.

As described above, according to the present invention, each function of the mobile communication terminal can be executed in an optimal function profile by selectively blocking power supply to unused or unnecessary components so that unnecessary power consumption of the mobile communication terminal can be reduced.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims. While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

What is claimed is:

1. A method operable in a mobile communication terminal for managing a battery usage in the mobile communication terminal, the method comprising:
   determining whether a function profile setting is set, the function profile setting including an operational setting for selected ones of a plurality of hardware elements within the mobile terminal, the plurality of hardware elements comprising at least one of a brightness level of a display, a clock frequency of a clock generator, an on/off condition of a local area wireless communication protocol, an on/off condition of a Hard Disc Drive, or a brightness condition of a key pad;
   selecting, if the function profile setting is set, a specific function and executing the function according to the set function profile,
   wherein the selected ones of the plurality of hardware elements within the mobile terminal are set to the operational settings associated with the selected function profile settings, wherein the operational settings are set to optimize operation of the selected function by selectively blocking power supply to the hardware elements in the selected function according to the function profile, and wherein the specific function is one of a phone function, a texting function, a music playing function, a video playing function and a gaming function.

2. The method of claim 1, further comprising:
   determining whether the function profile setting exists; and
   executing, if the function profile setting exists, the function profile setting.

3. The method of claim 1, further comprising:
   determining whether the function profile setting exists;
   selecting, if the function profile setting exists, a specific function; and setting the set function profile to the selected function.

4. The method of claim 2, wherein the set function profile comprises a list of each unit of the mobile communication terminal.

5. The method of claim 1, further comprising executing, if another function is selected while executing the function according to the set function profile, the newly selected function according to a corresponding set function profile.

6. The method of claim 5, further comprising:
   suspending, if the newly selected function is a call reception, the executing function and connecting communication; and
   executing again, if the communication is terminated, the suspended function according to the set function profile.

7. The method of claim 1, wherein executing the function according to the set function profile further comprises returning, if a termination signal of the executing function is received, to a standby state in a maximum power saving mode.

8. A method operable within a mobile terminal, the method comprising:
   detecting, in a settings menu, a user input to set a first function profile for a first function, the first function profile including at least one hardware component operational setting, and the at least one hardware component operational setting being set in the first function profile differently than that of a second function profile for a second function of the terminal; and
   executing, in a function execution mode, the first or second functions according to the first or second function profiles, respectively;
   wherein each of the first and second functions is a different one of a phone function, a texting function, a music playing function, a video playing function and a gaming function; and the at least one hardware component operational setting is at least one of: a brightness level of a display; a clock frequency of a clock generator; an on/off condition of a local area wireless communication protocol; an on/off condition of a Hard Disc Drive; or a brightness condition of a key pad.

9. The method of claim 8, wherein the brightness level of the display is settable in the first and second function profiles to at least one intermediate brightness level.

10. The method of claim 8, wherein the local area wireless communication protocol is the Bluetooth protocol.

11. The method of claim 8, further comprising executing, if another function is selected while executing the first or second function according to the set function profile thereof, the selected another function according to a corresponding set function profile.

12. The method of claim 11, further comprising:
    suspending, if the another selected function is a call reception, the executing function and connecting communication; and
    executing again, if the communication is terminated, the suspended function according to the set function profile.

13. The method of claim 8, wherein executing the first or second function according to the set function profile further comprises returning, if a termination signal of the executing function is received, to a standby state in a maximum power saving mode.

14. A mobile communication terminal having a function profile setting function to manage its battery usage, the mobile communication terminal comprising:
    a function profile setting unit for setting a function profile, the function profile including an operational setting of selected hardware components of the mobile terminal; and
    a controller for controlling a driving of each component of the mobile communication terminal according to a function profile setting set by the function profile setting unit,
    wherein the operational settings in the function profile are set to optimize operation of a corresponding function by selectively blocking power supply to one or more hardware elements unused for executing the selected function; and
    wherein the one or more hardware elements is at least one of: a brightness level of a display; a clock frequency of a clock generator; and on/off condition of a local area wireless communication protocol; an on/off condition of a Hard Disc Drive; or a brightness condition of a key pad, and wherein the function is one of a phone function, a texting function, a music playing function, a video playing function and a gaming function.

15. The mobile communication terminal of claim 14, wherein the function profile setting unit, if the function profile setting is set, automatically sets a function profile.

16. The mobile communication terminal of claim 14, wherein the function profile setting unit randomly sets a function profile.

17. A mobile communication terminal having a function profile setting function to manage its battery usage, the mobile communication terminal comprising:

a function profile setting unit for setting a function profile, the function profile including operational settings of selected hardware components of the mobile terminal; and a controller for controlling a driving of each component of the mobile communication terminal according to a function profile setting set by the function profile setting unit wherein the controller and function profile setting unit are configured to detect, in a settings menu, a user input to set a first function profile for a first function, the first function profile including at least one hardware component operational setting, and the at least one hardware component operational setting being set in the first function profile differently than that of a second function profile for a second function of the terminal; and the controller executes, in a function execution mode, the first or second functions according to the first or second function profiles, respectively;

wherein each of the first and second functions is a different one of a phone function, a texting function, a music playing function, a video playing function and a gaming function; and the at least one hardware component operational setting is at least one of: a brightness level of a display; a clock frequency of a clock generator; an on/off condition of a local area wireless communication protocol; an on/off condition of a Hard Disc Drive; or a brightness condition of a key pad.

18. The mobile communication terminal of claim 17, wherein the function profile setting unit, if a function profile setting is set, automatically sets a function profile.

19. The mobile communication terminal of claim 17, wherein the function profile setting unit randomly sets a function profile.

20. The method of claim 13, wherein the maximum power saving mode includes an off condition of a local area wireless communication protocol.

* * * * *

UNITED STATES PATENT AND TRADEMARK OFFICE
CERTIFICATE OF CORRECTION

| | | |
|---|---|---|
| PATENT NO. | : 8,862,187 B2 | Page 1 of 1 |
| APPLICATION NO. | : 11/799784 | |
| DATED | : October 14, 2014 | |
| INVENTOR(S) | : Kyu Hyun Kim | |

It is certified that error appears in the above-identified patent and that said Letters Patent is hereby corrected as shown below:

In the Claims,

Column 10, Claim 20, Line 18 should read as follows:
--...an on/off condition of...--

Signed and Sealed this

Thirteenth Day of January, 2015

Michelle K. Lee
*Deputy Director of the United States Patent and Trademark Office*